Sept. 1, 1925. 1,552,216
C. C. EDDY
VEHICLE TOP
Filed May 17, 1923 2 Sheets-Sheet 2

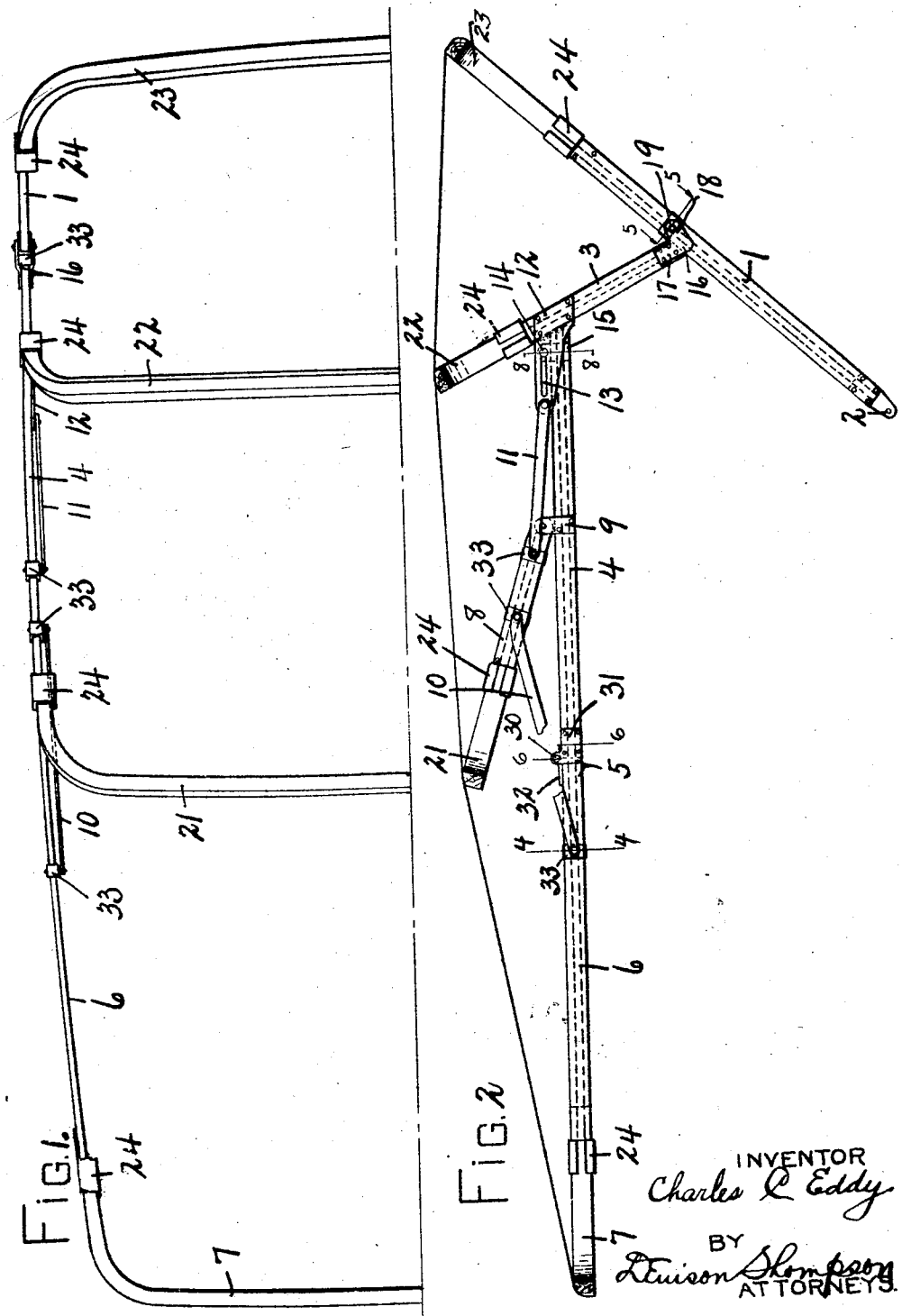

INVENTOR
Charles C. Eddy
BY
Luison Thompson
ATTORNEYS.

Patented Sept. 1, 1925.

1,552,216

UNITED STATES PATENT OFFICE.

CHARLES C. EDDY, OF CORTLAND, NEW YORK, ASSIGNOR TO THE BREWER-TITCHENER CORPORATION, OF CORTLAND, NEW YORK, A CORPORATION OF NEW YORK.

VEHICLE TOP.

Application filed May 17, 1923. Serial No. 639,542.

*To all whom it may concern:*

Be it known that I, CHARLES C. EDDY, a citizen of the United States of America, of Cortland, in the county of Cortland, in the State of New York, have invented new and useful Improvements in Vehicle Tops, of which the following, taken in connection with the accompanying drawings, is a full, clear, and exact description.

This invention pertains to a new and improved vehicle top particularly designed for use in connection with automobiles, altho it may be used in various other associations.

The main object of the invention resides in the production of a comparatively light but strong and firm structure of what may be called a "one-man top" that is easily folded into its collapsed condition or readily extended into its raised position, and in which novel and efficient provision is made for positioning and supporting the parts in desired relation when the top is extended without interfering with the collapsing of the structure.

More specifically, a stop means is provided for preventing further movement in an extensible direction of certain parts of the structure and for rigidly supporting them in pre-determined position against further movement in that direction when the desired extended position of the top structure is reached.

The present invention aims to provide for improvement in the lines of the conventional vehicle top and in all respects make same conform to the requirements of the so-called clear-vision type of top. This feature requires an exceptionally long but well braced overhung outrigger truss-like superstructure extending forwardly from a set of main rear bow sockets to the windshield support.

This result is partly obtained by the use of a set of mast-like main or rear bow sockets pivotally attached to the body gooseneck or pivot irons. A boom-like bow standard extending obliquely upward and forward, is pivotally attached to each of the respective mast-like bows by means of novel crank-arms which are adapted to serve as a pivoted stop or lock joint between the respective adjoining parts. The ends of rear sections of my bipartite outrigger bow are attached to their respective standards by means of a modified type of stop-pivot joint, and the combination of these two sets of stop joints are made to augment the internal bracing of the top superstructure and to provide against break down or other failure on part of the jointed bipartite outrigger bow.

The side rail elements of my outrigger structure are preferably bridged by means of one or more auxiliary transverse bows and these are suitably linked and otherwise equipt with means to readily allow the extended top elements to fold back and collapse against their respective main bow supports.

Other objects and advantages relate to the details of form, construction and arrangement of the parts particularly the use of a tubular metal bow structure adapted to sheath filler blocks, all as will more fully appear from the following description, taken in connection with the accompanying drawings, in which:—

Figure 1 is a partial top plan view of the structure.

Figure 2 is an elevation looking from the inside of the top structure.

Figure 3:
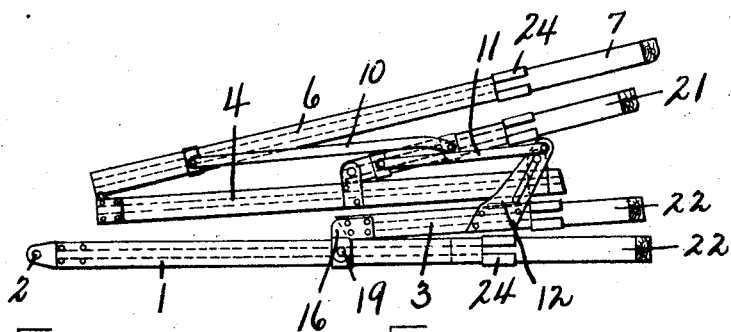
Figure 3 illustrates the top structure partially collapsed.
Figure 4:
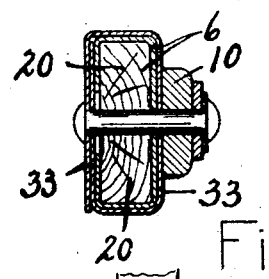
Figure 4 is a section on line 4—4, Figure 2.

The top of this invention, as illustrated in the drawings, comprises a main arm or rear bow-support —1— which is adapted to be pivoted at —2— to a side portion of a vehicle body (not shown). The bow support —1— extends preferably as shown, rearwardly and upwardly from the vehicle body so as to leave substantially the entire side of the top and practically the entire side of the vehicle open and unobstructed to constitute a clear vision type of top. A bow standard —3— is pivotally connected to the main arm —1— at an intermediate point along the latter and in a novel manner, as will be hereinafter described.

Preferably the standard —3— extends upwardly and forwardly from the bow support

—1— in a boom like fashion and carries near its upper end, the rear section —4— of stop-jointed outrigger side rails —5—, the front section —6— of which carries the front cross bow —7—. The adjacent ends of the sections —4— and —6— abut flatly against each other when the top is extended to form a stop joint for the sections which pivot about the bolt —30— passing through the knuckle joint elements —31— and —32— connected to respective sections. The auxiliary bow support —8— is pivotally connected to a bracket —9— that is connected to and carried by an intermediate portion of the rear section —4— of the outrigger. The link —10— is preferably connected to the front section —6— of the outrigger and to an intermediate portion of the auxiliary bow-support —8— while the link —11— is pivotally connected to the lower portion of the auxiliary bow-support —8— and to the front end of a bracket —12— carried by the bow standard —3—.

Figures 6, 8:
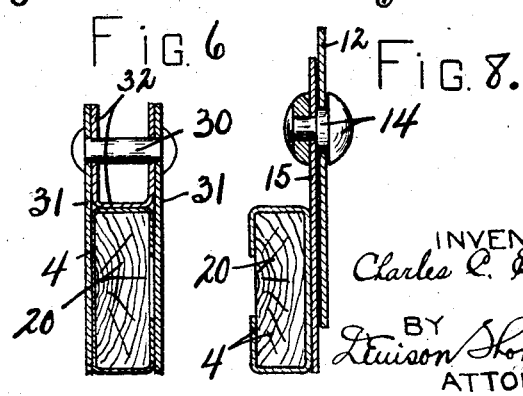
Figure 6 is a section on line 6—6, Figure 2.
Figure 8 is a sectional view taken along the line 8—8 of Fig. 2.

The rear section —4— of the outrigger —5— has its rear end connected to and supported by the bow support —3— in a new and novel manner in that the bow —3— carries, as before stated, the standard bracket —12— which extends forwardly from the bow, the forwardly extending portion being preferably slightly off-set to one side as indicated in Figure 8, to permit the unobstructed collapsing of the structure. This bracket —12— forward of the bow standard —3— is provided with a longitudinally extending slot —13— which, as illustrated, is horizontally disposed when the top is extended and constitutes, in connection with pin or stud —14— mounted on the bracket —15— secured to section —4—, a sliding pivotal connection between the rear section —4— and the bow standard —3—. The rear outrigger section —4— has its rear rail end shaped obliquely so as to lie in flat contact with the forward face of the obliquely disposed bow standard —3— and this abutment serves to lock the outrigger —4— against downward movement with respect to the element —3— when the predetermined position of the top is reached. The bow standard —3— is in turn locked from further movement in an extensible direction when said desired position is reached, by having its lower end obliquely formed, as indicated in dotted lines, Figure 3, so as to rest flatly against the forward face of the main arm —1— when the parts are fully extended, as indicated in Figure 2. For the purpose of permitting this locking engagement of the lower end of the bow standard —3— with the upwardly inclined forward surface of the main arm —1—, the pivotal connection between the bow standard —3— and the main arm —1— is effected by means of a bifurcated crank —16—, or in this instance, a pair of crank legs disposed upon opposite sides of the main arm which constitutes an important feature of the present invention. Each such crank arm is provided with two legs —17— and —18— angularly disposed with respect to each other, in this instance their disposition being at approximately right angles. The leg —17— is rigidly connected to the standard —3— while the opposite leg —18— is swivelly connected to the main arm —1—, by the pivotal bolt —19— extending through the upturned end portion of the leg —18— which is off-set from the axis of the bow —3— as previously indicated. Any collapsing movement on part of the bow standard —3— will therefore cause its lower oblique abutting end to be moved away from the main arm —1— by reason of the throw produced by turning the crank element —16— about its pivot —19— and after reaching its collapsed position, the standard —3— will finally be made to fold up and lie alongside the main arm —1—.

In like manner the collapsing of the outrigger —5— is effected by raising front section —6—, which in turn causes the pivotal stud —14— to move forwardly in the slot —13— and draw the abutting oblique end of the rear section —4— of the outrigger away from the front face of the standard —3—, the forward sliding movement of the stud permitting simultaneous pivotal movement about the stud, whereby the outrigger together with its superstructure may be easily collapsed into the position shown in Figure 3.

These positive stops provided for both the outrigger —5— and the bow standard —3— not only properly position the parts and maintain them in desired position, but also permit certain portions of the structure to be formed of considerably lighter material without affecting the rigidity of the structure.

The described double stop-joint is made to center about the standard —3—, and it will be apparent that this construction serves to impart ample rigidity to the extended overhung superstructure to prevent the downward breaking of the bipartite outrigger joint —5—, especially as applied to such vehicle tops as are designed for a long wheel base and a single rear support such as the main arm —1—. The dispensing with all intermediate supports other than that afforded by the conventional windshield braces (not shown) gives this fully developed clear vision type of deck, a neat and attractive appearance and otherwise enhances the commercial worth of my improved top structure.

It will be understood that the fulcrumed main arm is intended to be further braced with respect to the vehicle body by means of conventional strainer webs or the like (not shown) running lengthwise of the top structure and extending downward over the rear bow —23— to the rear of the body tonneau.

Further, the stop provided at the rear end of the outrigger rail —5— permits the use of a horizontal outrigger which will sharply define the edge of a horizontal top covering, and is peculiarly adapted for use in connection with such covering as distinguished from the conventional types of bow socket structures in which the two jointed sections of the outrigger used are ordinarily inclined upward relatively to each other into an arch-like form to provide against downward breaking of the bipartite outrigger.

It will be understood that in general but one-half of a top structure is here illustrated, the other half being substantially identical with the one disclosed and utilized in co-operation with the one disclosed for the reception of the ends of the bows in like manner with this disclosure. The rear bow —23— is intended to bridge a pair of main arms such as —1—; the intermediate bow —22— to bridge a pair of standards such as —3—; the auxiliary bow to bridge a pair of linked and pivoted auxiliary sockets such as —8—; and the front bow to bridge a pair of bipartite outrigger side rails such as —5—.

Figure 7:
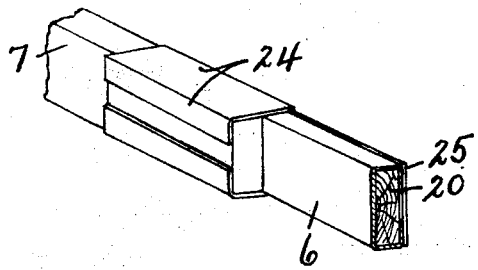
Figure 7 is a view of the flexible bow receiver illustrating its method of connection to the arms or bow supports of the structure.
Figure 5:
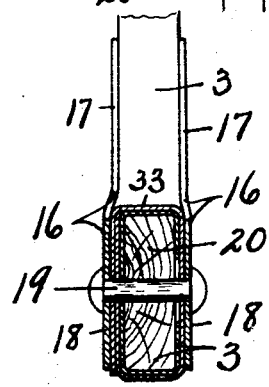
Figure 5 is a section on line 5—5, Figure 2.

In the illustration of this invention, the arms or bow elements are shown as formed of strips of sheet metal bent into substantially rectangular form and having the edges of the metal strip spaced apart to form an accessory gap for the passage of tacks or other securing means to the sheathed wood-filler —20— with which the bent-up strips of metal are filled. These arms or other top elements have their wide side disposed vertically as that is the direction in which the greatest strength is required and the longitudinal slot between the spaced edges of the rectangular metallic casing extends longitudinally of the arms. This feature of sheathed bow construction is more fully described and claimed in a copending application Serial No. 639541 filed May 17, 1923. The bows —21—, —22— and —23— may be secured to their respective bow supports or arms in any suitable manner, but preferably, each arm or bow support is equipped with a bow-receiving socket —24— which may be formed of a strip of metal bent into proper cross-section to receive the bow, and having its free edges spaced apart as best indicated in Figures 2 and 7 so as to form a resilient receiving socket having sufficient elasticity to accommodate itself to any reasonable variation in the cross-sectional size of bows. These sockets —24— have, as shown, flanges —25— extending therefrom and adapted to lie against the face of the adjacent end of the arm or bow-support with which the particular socket is assembled for securement thereto by riveting or otherwise, to form a rigid structure.

Where each connecting rivet or bolt is passed through an arm or bow support of this structure of sheet metal wood filler construction, the arm is preferably reinforced as shown in each case with a narrow strip —33— of sheet metal wrapped around the arm so that its ends overlap along one side of the arm.

Altho I have shown and described a specific construction, form and shape of top, together with perhaps preferred details of particular structures adapted for use in connection with this invention, I do not desire to limit myself to the details of form, construction or arrangement of the parts, or to the particular construction of the constituent elements thereof, as various changes may be made within the scope of the appended claims.

I claim:—

1. In a top for a vehicle body comprising a main arm swivelly disposed with respect to the body, a standard connected with and adapted to abut said arm, and a bifurcated crank whose one leg is secured to one end portion of said standard while its other leg end is directed away from the body fulcrum of the main arm and pivotally attached to said arm, said crank being adapted to guide the standard into abutment with said arm to form a positive stop therewith when the standard is swung into a predetermined extended position about the pivot.

2. In a collapsible top structure, a main arm, a standard connected thereto and adapted to abut said arm, a positive stop-joint comprising a bifurcated crank whose one leg is secured to one end portion of said standard while the other leg is pivotally connected to said arm and adapted to guide the crank end portion of said standard into abutment with said arm when the standard is swung into its extended position, a top superstructure overhung from and supported by said extended standard, and means for collapsibly folding said standard together with its superstructure against said main arm.

3. In a collapsible top for a vehicle body comprising a main arm swivelly disposed with respect to the body, a standard connected with and adapted to abut said arm, and a positive stop-joint comprising a bifurcated crank whose one leg is secured to one end portion of said standard while its other leg end is directed outwardly with respect to the swiveled end of the main arm and pivotally attached thereto, said crank being adapted to guide the said pivoted end portion of the standard into abutment with the face of the main arm when the standard is swung into a predetermined extended position and being further adapted to guide the standard into a substantially parallel but offset relation with respect to the axis of main arm when the standard is swung into its collapsed position.

4. In a collapsible vehicle top, a main arm, a standard connected thereto and adapted to abut said arm, a stop-joint comprising a bifurcated crank whose one leg is secured to one end portion of said standard while the other leg is pivotally connected to said main arm and adapted to guide the crank end portion of the standard into abutment with said arm when the standard is swung into a predetermined extended position, a top superstructure comprising a bipartite outrigger rail overhung from and supported by the extended standard, and a second stop-joint pivot means between adjoining end of said rail and said standard.

5. In a collapsible top for a vehicle body, a main arm and a rear bow therefor, a standard connected with and adapted to abut said arm, a stop-joint means adapted to guide the connected end portion of said standard into abutment with the face of the main arm when the standard is swung into a predetermined extended position, a bipartite outrigger bow overhung from and pivotally supported by the extended standard, and a second stop-joint means disposed between the standard and the adjacent end portion of the outrigger bow adapted to guide the last named bow into abutment with the face of the extended standard and serving in conjunction with the first named stop means to brace the overhung outrigger structure with respect to said main arm.

6. In a collapsible top for a vehicle body, a main arm pivotally disposed with respect to said body, a standard whose one end portion is connected with and adapted to abut said arm intermediate the ends thereof, a stop-joint means adapted to guide the connected end portion of said standard into abutment with the main arm when the standard is swung into a predetermined extended position, a front bow, a bipartite outrigger bow disposed intermediate the front bow and the standard, said outrigger being overhung from and pivotedly supported by the extended standard, a second stop-joint means disposed between the standard and the pivoted end portion of the outrigger bow, an auxiliary bow for the outrigger bow, and means including links disposed between the auxiliary bow and said outrigger bow adapted to allow of collapsing the extended top structure.

7. In a collapsible top for a vehicle body, a main arm swivelly connected to said body and inclined obliquely rearwardly and upwardly with respect to the main arm fulcrum, a standard whose one end portion is connected to said arm and inclined obliquely forwardly and upwardly therefrom, a stop-joint means adapted to guide the connected end portion of said standard into abutment with the oblique face of the main arm when the standard is swung into a predetermined extended position, a front bow, a bipartite outrigger bow disposed intermediate the front bow and the standard, said outrigger being pivotally supported by and overhung from said standard to extend forwardly of said main arm fulcrum, a second stop-joint means between the standard and the pivoted end portion of the outrigger bow adapted to act conjointly with the first named stop-joint to support and brace said overhung outrigger bow with respect to said main arm.

In witness whereof I have hereunto set my hand this 4th day of May, 1923.

CHARLES C. EDDY.